United States Patent [19]

Moore et al.

[11] Patent Number: 5,675,225
[45] Date of Patent: Oct. 7, 1997

[54] INTERACTIVE PET TOY

[76] Inventors: Herbert Arthur Moore, 3741 Hunt Rd., Lapeer, Mich. 48446; Al Lynn Wilson, 3487 Esson Dr., Grand Blanc, Mich. 48439

[21] Appl. No.: 518,374

[22] Filed: Aug. 23, 1995

[51] Int. Cl.$^6$ .................................................. A01K 15/02
[52] U.S. Cl. ........................ 318/257; 318/293; 119/708
[58] Field of Search .................................. 119/707, 708; 318/257, 280, 281, 283, 293

[56] References Cited

U.S. PATENT DOCUMENTS

| | | | |
|---|---|---|---|
| 3,895,276 | 7/1975 | Brown et al. | 318/231 |
| 4,930,448 | 6/1990 | Robinson | 119/707 |
| 5,103,770 | 4/1992 | Berkovich | 119/707 |
| 5,119,001 | 6/1992 | Moore et al. | 318/257 |
| 5,524,326 | 6/1996 | Markowitz | 119/707 |

*Primary Examiner*—Brian Sircus
*Attorney, Agent, or Firm*—Donald C. Bolger, P.C.

[57] ABSTRACT

A novel motor belt drive mechanism which rotates a mouse or other toys to amuse, occupy, and entertain pets. The device is battery powered with a switch which can be turned on and off to attract a cat or other pet. The device has a low profile, thereby making it difficult to tip over. The device is battery operated and has no exposed dangerous voltage wires for pets to chew on. The device may be mounted in virtually any plane and in rotation may be allowed to animate other suspended devices for further variation. The rotating toy device may be locally or remotely manually oscillated to cause an erratic changing field of direction and at the same time allowing direct inter-action pet entertainment for elderly, disabled and persons with impaired senses.

6 Claims, 4 Drawing Sheets

INTERACTIVE PET TOY

CROSS-REFERENCES TO RELATED APPLICATIONS

None

STATEMENT AS TO RIGHT TO INVENTIONS MADE UNDER FEDERALLY SPONSORED RESEARCH AND DEVELOPMENT

Not applicable.

BACKGROUND OF THE INVENTION

The field of the invention is generally that of amusement devices, and more specifically, to a novel toy for pet animals which includes a stationary base having means for propelling a suspended member.

The present invention is an improvement in U.S. Pat. No. 5,119,001. The improvement consists of a motor belt drive mechanism, a simpler circuit, a simplified vertical rotating arm and an interactive switch. The motor belt drive mechanism produces less noise which is more pleasing to operators and pets. The simpler circuit is more economical to produce. The vertical rotating arm, due to its natural rotational motion, is used to animate other suspended devices. The electrical switch allows for interactive play between the pet and the person operating the unit.

The interactive pet toy can be operated by one who is physically able or disabled. An elderly or disabled person can now actively play with a pet by locally or remotely manually oscillating the direction of the pet toy. When the operator is physically able or elderly, bed-ridden confined to a wheel chair or have impaired senses a much greater value is added to the physical and physiological therapy derived from playing with a pet.

The present invention is intended to be used primarily as a toy for pets; pets of the feline family in particular. It is intended to provide amusement as well as playful diversion for the pet and owner, at the same time providing a theater of learning for keeping sharp its natural skills as a hunter and as a outlet for its predatory energies. The pet toy is a battery operated, rotating, belt driven electric device that lets the owner directly or remotely play with his pet from virtually anywhere. Once the device is initially turned on, the operator has the choice of either watching the pet play or actually participating, interactively, in real play with the pet. The device operates with a safe voltage range and may be left unattended.

Cats are, by their predatory nature, attracted to motion, and enticed by this device that rotates their favorite suspended cat toy in a erratic manner. The operator provides a changing direction that puts to test the pets natural skills as a predator. House cats, like people, are creatures of habit. When their very predictable environment becomes disrupted, for any reason, their territorial sense of security appears to become threatened and in many instances will manifest itself into symptoms of stress. When there is only one cat in the household, the pet is denied the opportunity to interact socially with other cats. It is the responsibility of the pet owner to provide the pet with a means to play, learn, exhaust its predatory aggressions caused by stress and now be able to form a closer bond by playing directly with its owner. Stress symptoms in cats appear in may forms, the most common being, refusal to use the litter box. Other biological symptoms that are indicative of cat stress are loss of appetite, changes in heat cycle and sometimes even a loss of hair. Some common behavioral signs of stress are hiding, irritability and hissing. The addition of this toy to a pet household and the ability of the owner and pet to communicate through direct play may well provide a more tranquil environment at the same time establishing a closer bond between the pet and owner as it provides amusement with or without the presence of the owner.

SUMMARY OF THE INVENTION

The present invention is an improvement in U.S. Pat. No. 5,119,001. The improvement consists of a motor belt drive mechanism, a simpler circuit, a simplified vertical rotating arm, and an interactive switch. The motor belt drive mechanism produces less noise which is more pleasing to pets. The simpler circuit is more economical to produce. The electrical switch allows for interactive play between the pet and the person operating the unit.

The present invention improvement now consists of a novel electric belt driven operator oscillated device. Because the unit is belt driven, it provides enough torque to insure self restarting after being stopped by a playful cat. The device has a low profile thereby making it difficult to tip over. By nature, cats are predators and have shown a tendency to chew on exposed cords. This device, when operated in an automatic mode, has no exposed dangerous high voltage wires and no power converters tying it to potentially dangerous household current. When the device is operated from remote direction control, the remote cord has only 1.5 volts direct current and is entirely safe for the pet as well as the operator.

Cats are predators and are particular responsive to movement. The present invention improvement may run manually or may be made to oscillate changing directions through operator participation. In either mode a cat is constantly provided with a moving target which entices the cat to use all of its senses, vision, touch, hearing, and the sense of smell if cat nip is used. The device can be mounted in virtually any plane; upright, inverted, mounted on a wall or hug on a door knob. In addition to its own self propulsion it may also be used to animate other devices.

It is an object of the invention to provide an improvement to a novel cat toy.

It is another object of the invention to provide a novel cat toy to amuse, occupy and entertain pets and operators of the device.

It is a further object of the invention to provide a novel pet toy to help cats that have grown over fearful, aggressive or have become poor hunters.

It is another object of the invention to provide a novel entertainment device that provides a learning environment, through direct interaction play between the operator and the pet, to insure the physical, mental and social well being of a normal, healthy and happy cat.

It is further object of the invention to provide an opportunity for the elderly and disabled to actively play with their pets form virtually any location.

It is another object of the invention to provide a novel battery operated belt driven device, however, propulsion may be provided by a spring, electric or other mechanical means and household current could also be used.

It is a further object of the invention to provide another method of forming into on continuous flowing formed rod, coupling shaft bearing assembly, with a line suspending a object such as a mouse.

It is another object of the invention to more effectively use the rotational motion of the vertical rod to animate other suspended devices.

It is another object of the invention to provide a lower cost toy by using a simpler circuit.

Further objects are implicit in the detailed description which follows hereinafter (which is to be considered as exemplary of, but not specifically limiting, the present invention) and said objects will be apparent to persons skilled in the art after a careful study of the detailed description which follows.

For the purpose of clarifying the nature of the present invention, one exemplary embodiment of the invention is illustrated in the hereinbelow-described figures of the accompanying drawings and is described in detail hereinafter. It is to be taken as representative of the multiple embodiments of the invention which lie within the scope of the invention.

DESCRIPTION OF THE PREFERRED EMBODIMENTS

Figure 1:
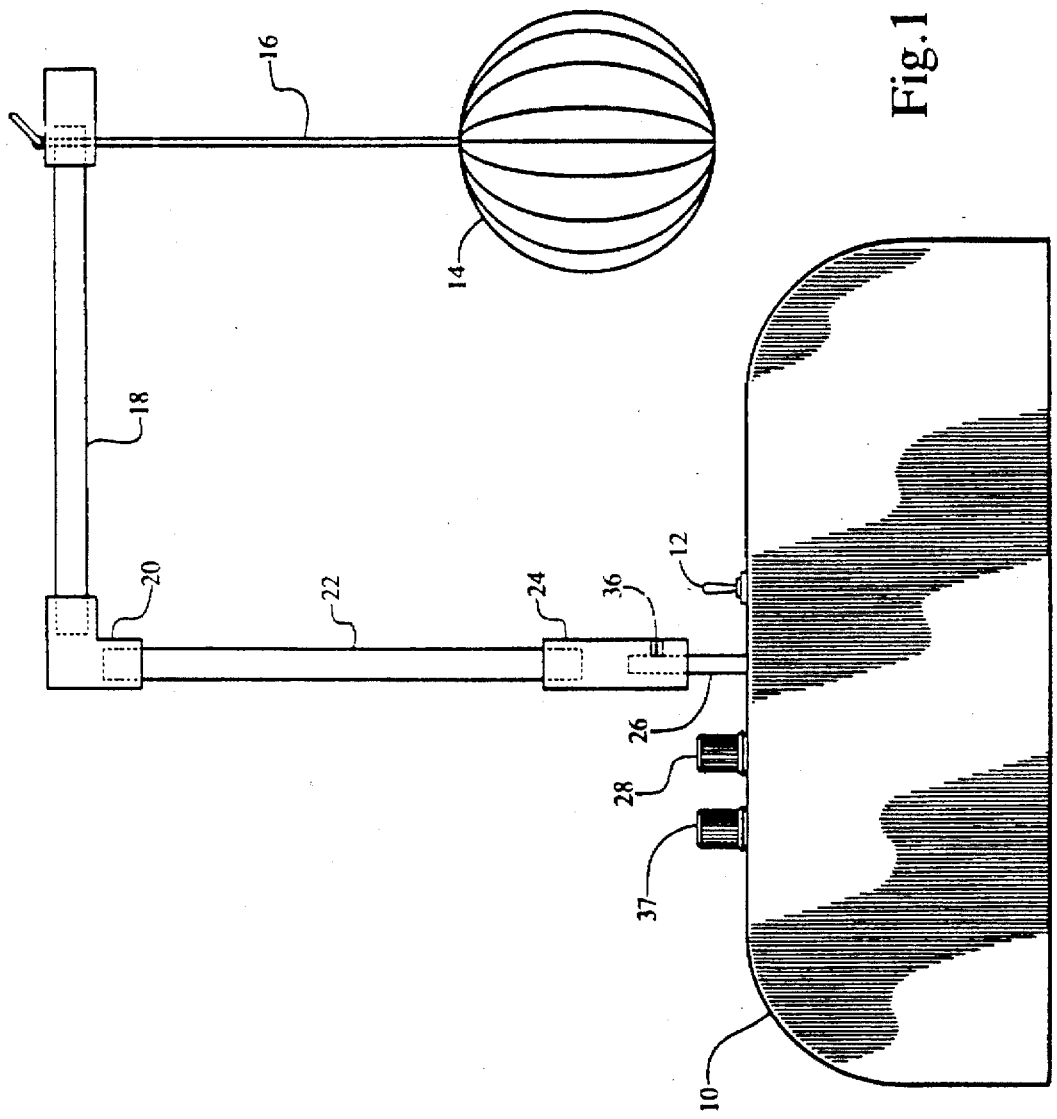
FIG. 1 is a perspective view showing one exemplary embodiment of one representative form of the invention.

Referring to FIG. 1, base 10 is a low profile support for toy 14 and is difficult to tip over. Switch 12 is mounted to remote switch housing 50 for remote operation and is used to turn device "on" and "off". An alternated switch can be used to reverse direction of the motor. Cable 49 is used to electrically connect switch 12 when mounted in remote switch housing 50. However, a wireless remote control could also be used. Shaft/Bearing assembly 26 is also mounted to base 10 and rotates when switch 12 is in the "on" position. The first end of rotating arm 52 is placed over the shaft/bearing assembly 26 and fastened by set screw 36, however, other means of fastening could also be used. The first end of line 16 is fastened to the second end of rotating arm 52 by tying, however, gluing or other type of fasteners could also be used. Toy 14 is fastened to the second end of line 16 by tying, however, gluing or other means could also be used.

Figure 2:
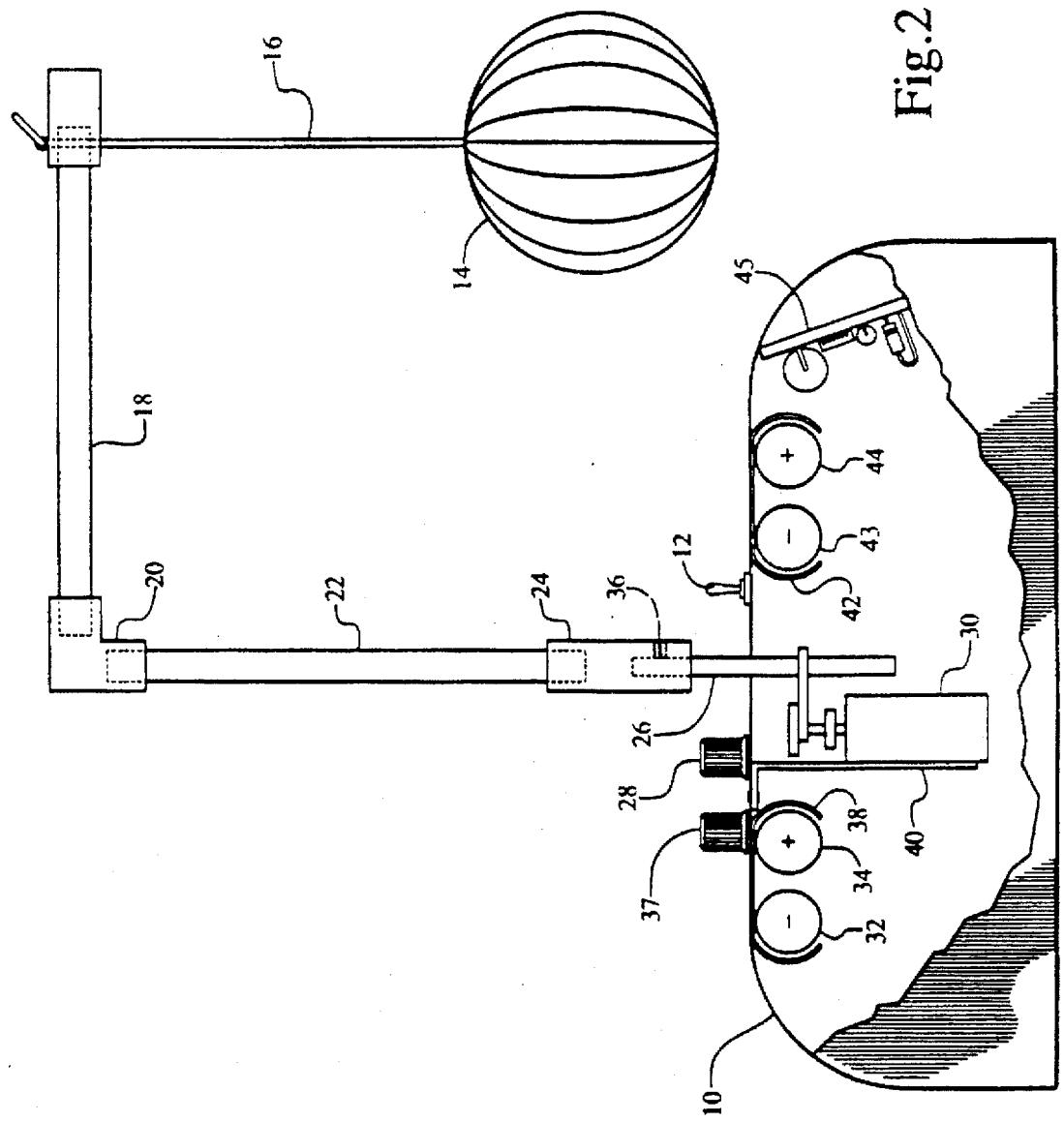
FIG. 2 is a partial cross section view showing one exemplary embodiment of one representative form of the invention.

Referring to FIG. 2, motor bracket 40 is secured to base 10 by screws, however, gluing or other fasteners could also be used. Switch 12 is mounted to base 10 for manual mode operation and is used to turn device "on" and "off." Motor 30 is connected to motor bracket 40 by screws, however, gluing or other fasteners could also be used. Bracket 42 is attached to base 10 by gluing, however, screws or other fasteners could also be used. Battery 43 is inserted into bracket 42 and held in place by spring tension.

Figure 3:
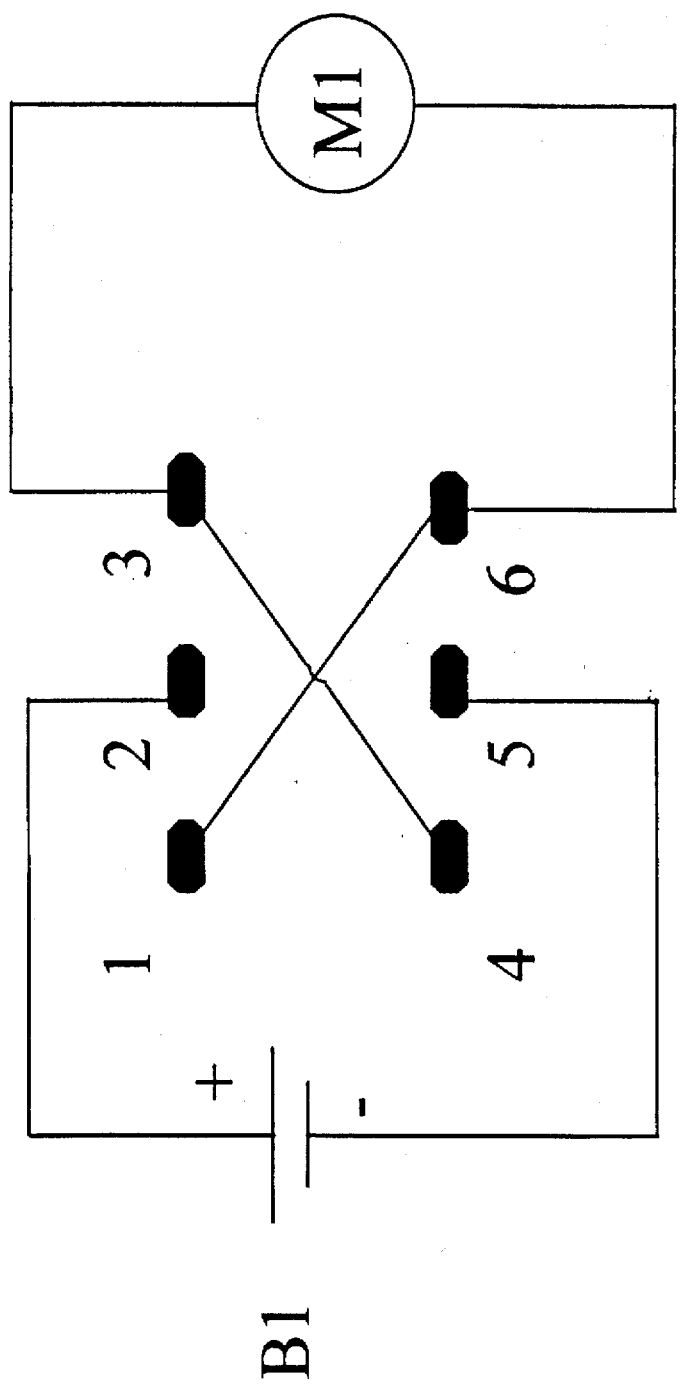
FIG. 3 is an electrical circuit diagram showing one exemplary embodiment of one representative form of the invention.

Referring to FIG. 3, switch S12 is a switch having six (6) terminals. Battery B1 is a battery having a positive and negative terminal. Motor M1 is a motor having a belt drive mechanism with a first terminal and a second terminal. Switch S12 is a switch having six (6) terminals and is used for a remote switch or a local switch. Local switch S12 is a center position off switch and may be actuated in one direction to make the toy rotate clockwise and oscillated to the other position to make the toy rotate counter-clockwise. Remote S12 refers to FIG. 1 and FIG. 4.

The positive terminal of battery B1 is connected to the second terminal of S12. The negative terminal of B1 is connected to the fifth terminal of S12. The fourth terminal of S12 is connected to the third terminal of S12. The first terminal of S12 is connected to the sixth terminal of S12 When S12 is activated, to the clockwise position, current flows from the second terminal of battery B1 to the fifth terminal of S12. S12 being actuated, current flows through S12 to the fourth terminal of S12 to the third terminal of S12 to the first terminal of M1. At the same time that S12 is actuated to the clockwise position, current flows through the second terminal of M1 to the sixth terminal of S12 to the first terminal of S12, through S12 to the second terminal of S12 and back to the positive terminal of battery B1.

When switch S12 is oscillated to the counterclockwise position, current flows from the negative terminal of battery B1 to the fifth terminal of S12, through S12 to the sixth terminal of S12 local to the second terminal of M1 through motor M1 to the first terminal of motor M1 to the third terminal of switch S12 to the second terminal of S12 to the first terminal of battery B1.

Figure 4:
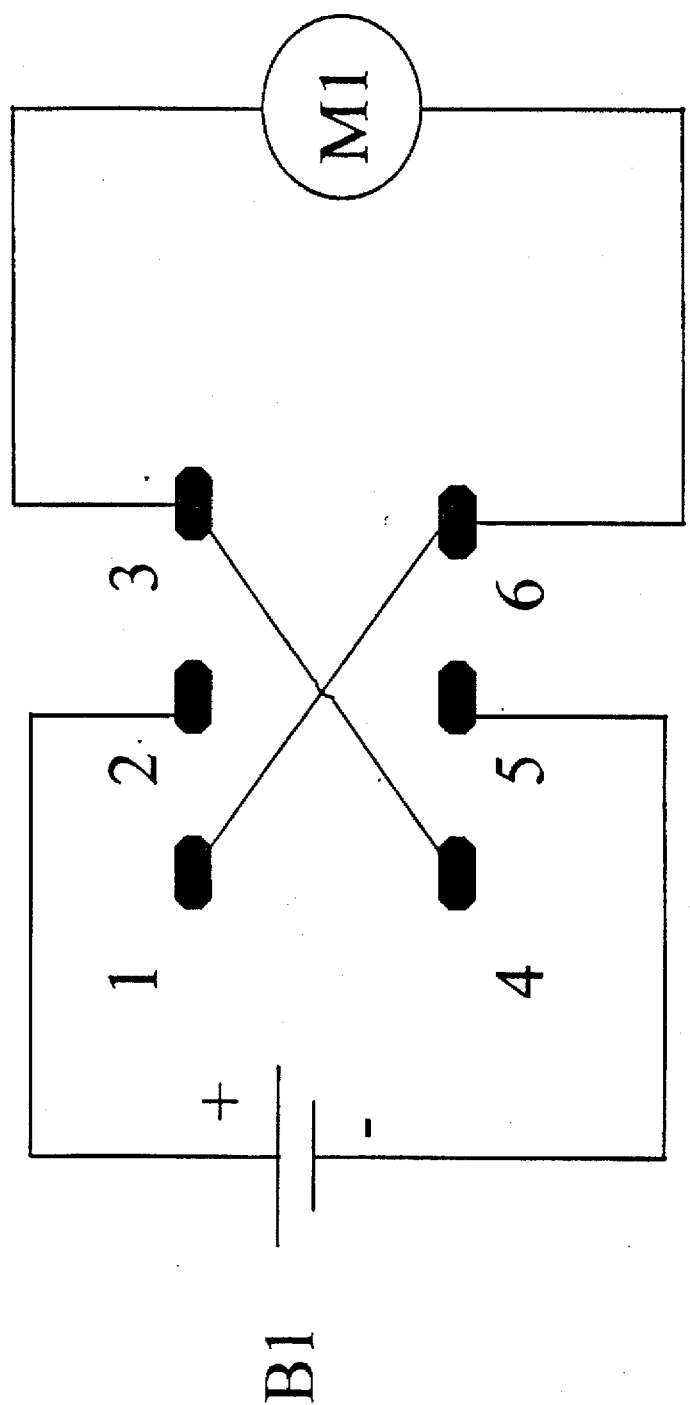
FIG. 4 is an electrical circuit diagram showing one exemplary embodiment of one representative form of the invention.

In FIG. 1 and FIG. 4, switch S12 is used as an alternate or remote control, the same current paths are taken thereby repeating itself but from a remote location allowing the device to be used by the elderly and disabled as well as other people.

What is claimed is:

1. An interactive pet toy for the amusement of pets comprising:

a support;

a motor attached to said support;

said motor having a first motor terminal and a second motor terminal;

an arm;

means for attaching said arm to said motor;

a suspended toy;

means for attaching said toy to said arm;

a battery having a positive terminal and a negative terminal;

means for attaching said battery to said support;

a double throw switch having a first switch terminal, a second switch terminal, a third switch terminal, a fourth switch terminal, a fifth switch terminal, and a sixth switch terminal;

means for attaching said switch to said support;

means for electrically connecting said second switch terminal to said battery positive terminal;

means for electrically connecting said fifth switch terminal to said battery negative terminal;

means for electrically connecting said third switch terminal to said fourth switch terminal and to said first motor terminal;

means for electrically connecting said first switch terminal to said sixth switch terminal and to said second motor terminal.

2. A device as recited in claim 1, wherein said switch is in a remote control mechanism.

3. An interactive pet toy for the amusement of pets comprising:

a support having a cylindrical shape;

a motor attached to said support;

said motor having a first motor terminal and a second motor terminal;

said motor having a belt drive shaft;

an arm having a horizontal portion;

means for attaching said arm to said drive shaft;

a suspended toy;

means for attaching said toy to said arm;

a battery having a positive terminal and a negative terminal;

means for attaching said battery to said support;

a double throw switch having a first switch terminal, a second switch terminal, a third switch terminal, a fourth switch terminal, a fifth switch terminal, and a sixth switch terminal;

means for attaching said switch to said support;

means for electrically connecting said second switch terminal to said battery positive terminal;

means for electrically connecting said fifth switch terminal to said battery negative terminal;

means for electrically connecting said third switch terminal to said fourth switch terminal and to said first motor terminal;

means for electrically connecting said first switch terminal to said sixth switch terminal and to said second motor terminal.

4. A device as recited in claim 3, wherein said switch is located in a remote control mechanism.

5. An interactive pet toy for the amusement of pets comprising:

a support having a cylindrical shape;

a direct current motor attached to said support;

said motor having a first motor terminal and a second motor terminal;

said motor having a belt drive and output shaft;

a vertical rotating arm having a horizontal portion;

means for attaching said arm to said output shaft;

a suspended toy;

means for attaching said toy to said arm;

a direct current battery having a positive terminal and a negative terminal;

means for attaching said battery to said support;

a double throw switch having a first switch terminal, a second switch terminal, a third switch terminal, a fourth switch terminal, a fifth switch terminal, and a sixth switch terminal;

means for attaching said switch to said support;

means for electrically connecting said second switch terminal to said battery positive terminal;

means for electrically connecting said fifth switch terminal to said battery negative terminal;

means for electrically connecting said third switch terminal to said fourth switch terminal and to said first motor terminal;

means for electrically connecting said first switch terminal to said sixth switch terminal and to said second motor terminal.

6. A device as recited in claim 5, wherein said switch is located in a remote control mechanism.

* * * * *